United States Patent
Singh et al.

(10) Patent No.: US 6,385,843 B1
(45) Date of Patent: May 14, 2002

(54) SELF-PENETRATING FASTENING SYSTEM

(75) Inventors: Sumanjit Singh, Gaimersheim (DE); Stuart Edmond Blacket, Queensland (AU); Trevor B. Jones, Bolton; Howard J. Litherland, Clywd, both of (GB)

(73) Assignee: Audi AG (DE)

( * ) Notice: Subject to any disclaimer, the term of this patent is extended or adjusted under 35 U.S.C. 154(b) by 0 days.

(21) Appl. No.: 08/619,672

(22) PCT Filed: Sep. 21, 1994

(86) PCT No.: PCT/EP94/03159

§ 371 Date: Apr. 29, 1996

§ 102(e) Date: Apr. 29, 1996

(87) PCT Pub. No.: WO95/09307

PCT Pub. Date: Apr. 6, 1995

(30) Foreign Application Priority Data

Sep. 29, 1993 (DE) .......................................... 43 33 052

(51) Int. Cl.⁷ ................................................. B23P 17/00

(52) U.S. Cl. ........................................ 29/798; 411/501

(58) Field of Search ...................... 29/525.06, 243.53, 29/798, 432.1; 411/181, 501, 502, 503, 504; 227/51, 58, 59

(56) References Cited

U.S. PATENT DOCUMENTS

| | | | | |
|---|---|---|---|---|
| 203,815 | A | * 5/1878 | Bray | ........................... 411/501 |
| 414,682 | A | * 11/1889 | Cummings | .................. 411/501 |
| 1,611,876 | A | 12/1926 | Berger | |
| 4,096,727 | A | 6/1978 | Gargaillo | |
| 5,621,961 | A | * 4/1997 | Schleicher | ............. 29/243.5 X |

FOREIGN PATENT DOCUMENTS

| | | |
|---|---|---|
| DE | 3003908 | 8/1981 |
| DE | 3942482 | 1/1991 |
| DE | 4237621 | 8/1993 |
| EP | 0129358 | 12/1984 |
| FR | 2350901 | 5/1976 |
| GB | 1538027 | 1/1979 |
| GB | 2184510 | 6/1987 |
| WO | WO 85/05414 | 12/1985 |
| WO | WO 94/14554 | 7/1994 |
| ZA | 918340 | 7/1992 |

OTHER PUBLICATIONS

Liebig, Hanns Peter; Mutschler, Jorg: Stanznieten fugt umformend ohne Vorlochen der Bleche. In: Bander Bleche Rohre, 4, 1993, S.46–50, 53–55; Liebig.

Hanns Peter; Mutschler, Jorg: Qualitats–grossen beim Stanznieten prczessbegleiterd uber–wachen. In: Bander Bleche Rohre, 5, 1993, S.52–54: Liebig, Hanns Peter; Mutschler, Jorg: Mechanische Verbindungen videografisch analysieren. In: Bander Bleche Rohre, 6, 1993, S.41,42,47–51: N.N.: Blech '90 in Essen: Elemente und Gerate zum Fugen. In: Bander Bleche Rohre, 1, 1991, S.52,54,56.

* cited by examiner

Primary Examiner—S. Thomas Hughes
(74) Attorney, Agent, or Firm—Lalos & Keegan

(57) ABSTRACT

The self-penetrating fastening device proposed consists of a rivet (3), acted on by a punch (13), and a die (15), the rivet consisting of a head (4) and a shank (6) with a central cavity (8) whose open end partly penetrates a metal sheet (1) in which it is held. At the end of the rivet shank (6) remote from the rivet head (4), the cavity (8) is essentially conical in shape, the angle of the aperture being α. In addition, the transition zone between the rivet shaft (6) and the underneath (11) of the rivet head (4) is essentially rounded (R1). A rivet joint produced using this device is sufficiently strong to meet severe requirements, and the surface of the metal sheet in the region of the rivet is not affected by the perforation process.

8 Claims, 1 Drawing Sheet

SELF-PENETRATING FASTENING SYSTEM

Figure 1:
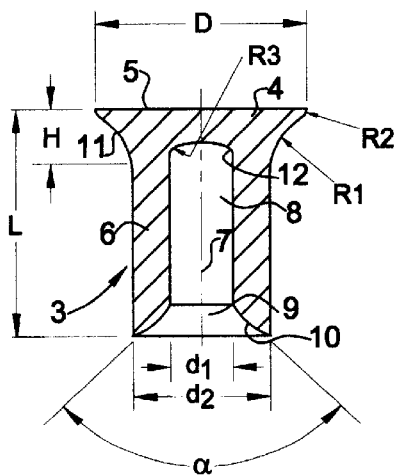

The invention relates to a self-penetrating fastening system including a rivet, a punch and a pressure pad (die), the rivet consisting of a head and shank with central cavity whose free end surface does not completely penetrate a workpiece (metal plate) receiving it.

A self-penetrating fastening system such as this is described in German Patent DE 39 42 482 C1. In the embodiment explained, two plates of different thicknesses, parts of the wall of a container, are connected to each other, particular value being attached to water and gas tightness. Corrosion stability is also taken into account in this state of the art.

If such self-penetrating fastening systems are also to be used in the area of automotive technology, for example in order to connect body sheets together, other essential factors are involved in addition to the corrosion stability in question. Because of the high mechanical stresses occurring, the strength of the connection of two plates is of decisive importance. In addition, depending on the place where the connection is applied (uncovered body areas), it should be possible to make the top of the rivet head as nearly flush as possible with the surrounding plate surface after manufacture. The process of producing the riveted connection should harm the surface areas in question as little as possible (e.g., through deformation resulting from warping of the sheet), so as to hold minimum any finishing operations required to improve the appearance.

The state-of-the-art riveted connection does not meet these additional requirements to the extent desired.

Hence it is the object of the invention to develop the state-of-the-art self-penetrating fastening device in such a way that the riveted connection produced by the device can meet high requirements with respect to its strength and so that the surface of the workpiece will not be permanently impaired.

It is claimed for the invention that this is accomplished in that the self-penetrating fastening system possesses the additional features presented in the descriptive portion of claim 1.

As a result of the design of the shank cavity in the area of the free end surface in the area of the free end surface, the cavity being conical in the broadest sense of the word, as the rivet penetrates a workpiece more deeply the resulting higher expansion force causes the radial movement of the rivet shank outward (effects expansion) to reach an order of magnitude such that an expansion angle >45° may be reached. On the other hand, this process results in an undercut increasing the strength, the direct tensile strength in particular (end area of the rivet shank projecting radially further than the convexity of the lower sheet adjoining the jacket of the free end surface and the more or less rounded transition of the shaft into the rivet head during riveting also result in the gentlest possible treatment of the upper sheet during penetration of an upper sheet as illustrated in the embodiment, and also make certain that, among other things, if the rivet head has a flat top, this top can be embedded so as to be flush with the surrounding surface of the sheet and so that the circular notch marking the transition of rivet head to sheet surface is very narrow and extremely shallow.

Supplementary developments of the invention are described in the dependent claims. In addition to the preferred embodiment indicated, it is to be regarded as a special development (claim 6) that the circumferential wall of the die cavity is designed so as to be radially movable. Especially in the case of thin sheets this involves a supporting effect during cutting of the top sheet, without the process of spreading of the rivet shaft in the bottom plate being impaired in any way whatever, since the spring-mounted groove blocks (claim 7) can move radially outward as required.

Figure 2:
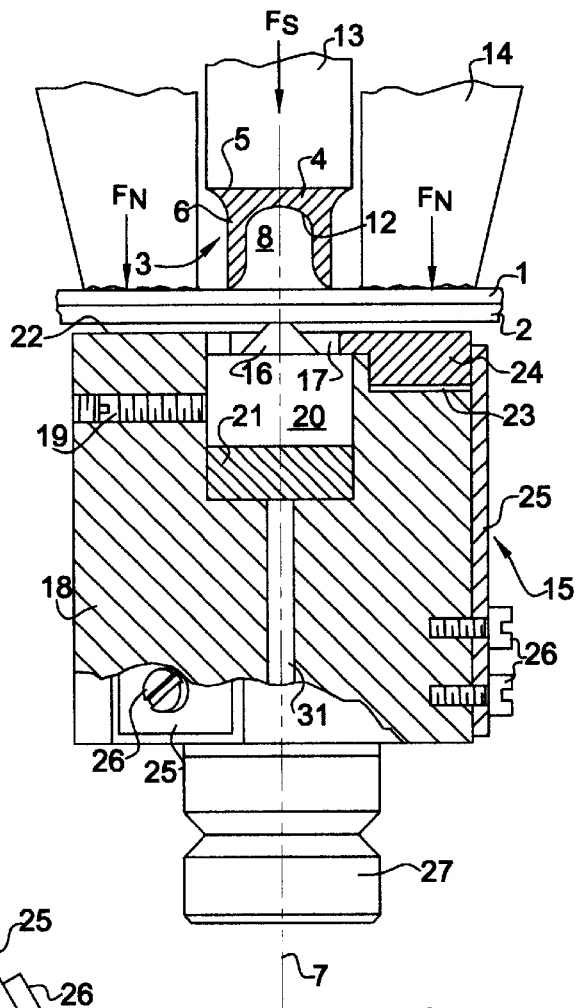
Figure 3:
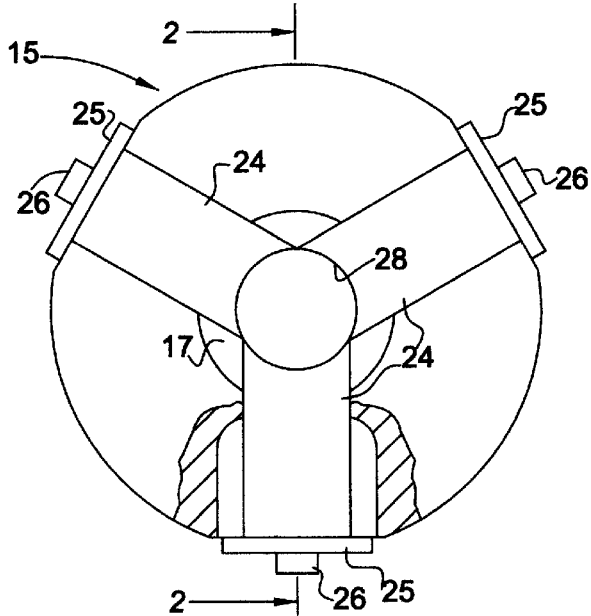
Figure 4:
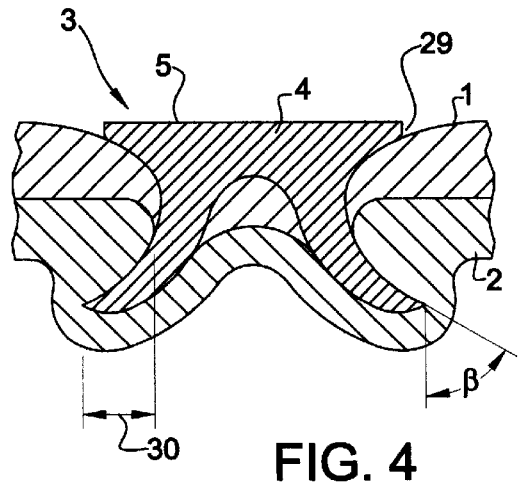

Preferred embodiments of the object of the invention are shown in the drawing and are explained in what follows with reference to appropriate parts of the drawing, in which FIG. 1 shows a rivet as a component of the self-penetrating fastening device, FIG. 2 the layout of the individual elements (section of a multipart die along arrows II in FIG. 3) of the self-penetrating fastening device, along with the metal sheets to be connected which are received between these elements, FIG. 3 a top view of the multipart die, and FIG. 4 a riveted joint made on the basis of the invention.

As is revealed by examination of the figures as a whole, a top and a bottom metal sheet 1,2 are joined together by means of a rivet 3. The latter consists of a rivet head with flat top 5 and a cylindrical shank 6 with central (longitudinal axis 7) cavity 8.

In the area of the shank 6 facing away from the rivet heat 4 the cavity 8 is in the form of a cone 9 with aperture angle α, the sides 10 of the cone preferably being slightly convex. A "sharp edge" is virtually created as a result within the limits of the possibilities created by production technology; during stamping the rivet can penetrate the top metal sheet 1 by way of this edge and be embedded in the bottom metal sheet 2.

In addition to the cone aperture angle a, the shaping and dimensioning parameters of the rivet 3 as shown in FIG. 1 are the diameter d1 of the cavity 8, the diameter d2 of the rivet shank 6, the diameter D of the rivet head 4, the total length L of the rivet 3, the height H of the rivet head 4, the outwardly directed radius R1 for the transition between rivet shank 6 and bottom 11 of rivet head 4, the inwardly directed and adjoining radius R2 for the transition between rivet head bottom 11 and rivet head top 5, and radius R3 for the bottom of cavity 8. The height H of the rivet head 4 is determined from the beginning of transition from rivet shank 6 to outwardly directed radius R1.

The depth of the cavity 8 is such that its rounded bottom 12 (radius R3) extends into the rivet head 4 within the limits of the possibilities provided by the production technology.

Radius R1 prevents the occurrence of high peak stresses in the rivet head area during the perforation process, inasmuch as there are no sharp edges present.

The cone aperture angle α is to be selected preferably as a function of the properties of the material (yield point $R_{p0,2}$) of the metal sheets 1,2 to be joined. The following correspondences have been found to be advantageous:

$$R_{p0,2} \geq 250 \text{ N/mm}^2 \cong 75° < \alpha < 120°$$

$$R_{p0,2} < 250 \text{ N/mm}^2 \cong 25° < \alpha < 75°$$

The other components of the self-penetrating fastening device are shown diagrammatically in FIG. 2. The rivet 3 is impacted by a punching force $F_s$ applied by a punch 13 positioned on the top 5 of the rivet head 4. The punch 13 is surrounded by a pressure pad 14, which is in contact with the metal sheets 1,2 together with a die 15 functioning as counterpressure tool and has a pressure pad force $F_N$ applied to it. This pressure pad force $F_N$ should be kept constant during the rivet perforation process; this can be suitably accomplished by causing the pressure pad 14 to have force applied to it by a suitable pressure-controlled hydraulic unit.

The top surface of the pressure pad 14 in contact with the top metal sheet is roughened in order to optimize the action of this pad. As a result, excessive drawing of the surrounding sheet areas into the perforation zone during perforation can be prevented; instead, the top metal sheet 1 is cut cleanly.

The multipart die 15 illustrated in FIGS. 2 and 3 has a drift 20 with punching stud 16. The drift 20 is received into a suitably dimensioned cavity 17 of a drift recess 18 and held there by a setscrew 19 introduced into the cavity. The punching stud 16 can be caused to project a greater or lesser distance beyond the top 22 of the drift recess 18 by a shim 21 of specific thickness, one which can easily be replaced by another shim of a different thickness. A vent 31 made in the drift recess 18 extends to the cavity 17.

Three radially oriented grooves 23 evenly distributed over the circumference are made in the top 22 of the drift recess 18, each groove receiving a block 24. The ends of the groove blocks 24 facing punching stud 16 are curved in shape and complement each other to form a closed circle.

The radially outer end of each groove block 24 has force applied to it by a leaf spring 25 which is fastened to the drift recess 18 by pan head screws 26. Lastly, a pin 27 projecting downward from the drift recess 18 serves to receive and immobilize it in a tool.

During the riveting process the groove blocks 24 are forced outward by the material displaced by the rivet 3, that of the bottom metal sheet 2 in particular, so that an additional cavity promoting the spreading process is ultimately provided for the rivet 3. After the joint has been produced and the resulting bond material removed from the die, the leaf springs 25 force the groove blocks back into their initial position.

It is essential for the diameter of the die (circle 28 formed by the groove blocks 24) to be at the beginning of the joining process only slightly larger than the outer diameter $d_2$ of the rivet shank 6, so that the perforation of the top of the metal sheet 1 facing the rivet will be as clean as possible without the metal sheet being drawn into the die 15.

Lastly, FIG. 4 shows a finished riveted joint. It is made especially clear here that the top 5 of the rivet head 4 is flush with the top of the top metal sheet 1. It is also to be seen that the circular indentation 29 in the transitional area between rivet head 4 and top metal sheet 1 is quite small and shallow. FIG. 4 also shows the large undercut 30 greatly enhancing the strength of the riveted joint. This undercut 30 results among other things from the large rivet shank expansion angle $\beta$ (>45° if necessary) formed with the rivet 3 during perforation.

The self-penetrating fastening device may, of course, also be used to join more than two sheets, or even to fasten only one rivet, for instance one with a bolt head, in a single sheet.

Nor is application restricted to the joining of metal plates or metal sections. On the contrary, nonmetallic workpieces (e.g., ones of plastic) may also be joined by means of this device.

What is claimed is:

1. A self-penetrating fastening system including a rivet, a punch and a counterpressure tool, wherein:

said rivet includes a rivet head and a rivet shank, said rivet shank including a center cavity and a free end remote from said rivet bead that does not fully penetrate a workpiece receiving said shank during a rivet operation;

said rivet shank free end remote from said head including a cylindrical outside wall surface and a substantially conical inside wall surface having an aperture angle; and including a substantially rounded transition region having a radius and extending from said shank to an upper portion of said rivet head.

2. A system as in claim 1 wherein said rivet head includes a flat top for joining flush with a top of a workpiece after completion of said rivet operation.

3. A system as in claim 1 wherein said rivet shank expands to an expansion angle $\beta$>45° during said rivet operation.

4. A system as in claim 1 wherein said counterpressure tool includes a roughened surface for contact with a workpiece in an area surrounding said punch.

5. A system as in claim 1 wherein said counterpressure tool includes a cavity for receiving an expanding rivet shank, said tool cavity including a radially moveable circumferential wall, and said counterpressure tool includes a drift support, grooves on a top side of said drift support facing a workpiece, groove blocks guided in said grooves, and springs for pressuring said groove blocks.

6. A system as in claim 5 wherein said counterpressure tool includes a drift support, a central cavity in said drift support for holding a drift, and three radially oriented grove blocks evenly distributed over the circumference of said drift support and including ends that face said drift and complement each other to form a circle.

7. A system as in claim 1 wherein said rivet head has a height determined from a beginning of said transition region to said upper portion of said rivet head over a second transition region having a radius, and wherein said center cavity includes a bottom that extends into said height of said rivet head.

8. A system as in claim 1 wherein said counterpressure tool includes a cavity for receiving an expanding rivet shank, said tool cavity including a radially movable circumferential wall.

* * * * *